(12) United States Patent
Giertz

(10) Patent No.: US 9,705,334 B2
(45) Date of Patent: Jul. 11, 2017

(54) METHOD FOR OPERATING A WIND ENERGY INSTALLATION

(75) Inventor: Helge Giertz, Leer (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 737 days.

(21) Appl. No.: 14/239,999

(22) PCT Filed: Aug. 14, 2012

(86) PCT No.: PCT/EP2012/065911
§ 371 (c)(1),
(2), (4) Date: Apr. 18, 2014

(87) PCT Pub. No.: WO2013/026748
PCT Pub. Date: Feb. 28, 2013

(65) Prior Publication Data
US 2014/0225446 A1    Aug. 14, 2014

(30) Foreign Application Priority Data

Aug. 23, 2011    (DE) .................. 10 2011 081 446

(51) Int. Cl.
*H02J 3/40* (2006.01)
*H02J 3/24* (2006.01)
*H02J 3/38* (2006.01)

(52) U.S. Cl.
CPC ....... *H02J 3/40* (2013.01); *H02J 3/24* (2013.01); *H02J 3/386* (2013.01); *Y02E 10/721* (2013.01); *Y02E 10/763* (2013.01); *Y10T 307/718* (2015.04)

(58) Field of Classification Search
CPC ........................................... H02J 3/40
(Continued)

(56) References Cited

U.S. PATENT DOCUMENTS 7,197,378 B2    3/2007    Sato et al.
7,392,114 B2    6/2008    Wobben
(Continued)

FOREIGN PATENT DOCUMENTS

CL    9702012    8/2012
CL    34612012    4/2013
(Continued)

OTHER PUBLICATIONS

*Technical Guideline, Generating Plants Connected to the Medium-Voltage Network.* BDEW (German Association of Energy and Water Industries) Guideline for Generating Plants' Connection to and Parallel Operation with the Medium-Voltage Network, Jun. 2008, pp. 29/138 (Plus English Translation pp. 28/130), 6 pages.
(Continued)

*Primary Examiner* — Joseph Chang
(74) *Attorney, Agent, or Firm* — Seed IP Law Group LLP

(57) ABSTRACT

The present invention concerns a method of feeding electric power into an electric network wherein the feed is effected by means of at least one wind power installation with a first feed-in arrangement at a feed-in point into the electric network, and the feed is effected in dependence on electric parameters in the network and measurement values of the electric parameters or measurement values for determining the electric parameters are detected at measurement times at predetermined time intervals and wherein the measurement times are synchronized to an external time signal available outside the first feed-in arrangement.

18 Claims, 2 Drawing Sheets

(58) Field of Classification Search
USPC .......................................................... 307/84
See application file for complete search history.

(56) References Cited

U.S. PATENT DOCUMENTS

| | | | |
|---|---|---|---|
| 8,692,419 | B2 | 4/2014 | Fortmann et al. |
| 2004/0010350 | A1 | 1/2004 | Lof et al. |
| 2004/0141272 | A1 | 7/2004 | Wobben |
| 2004/0178639 | A1 | 9/2004 | Wobben |
| 2004/0207264 | A1 | 10/2004 | Sato et al. |
| 2013/0043690 | A1 | 2/2013 | Wilson et al. |
| 2013/0141951 | A1 | 6/2013 | Adloff |

FOREIGN PATENT DOCUMENTS

| | | |
|---|---|---|
| CN | 1477749 B | 5/2010 |
| DE | 19 756 777 A1 | 7/1999 |
| EP | 2 113 980 A2 | 11/2009 |
| JP | 9-74684 A | 3/1997 |
| JP | 2004-88824 A | 3/2004 |
| JP | 2007-202266 A | 8/2007 |
| JP | 2009-239990 A | 10/2009 |
| JP | 2010-239782 A | 10/2010 |
| JP | 2011-127461 A | 6/2011 |
| TW | M397476 U1 | 2/2011 |
| WO | 02 086315 A1 | 10/2002 |
| WO | 2008/125163 A1 | 10/2008 |
| WO | 2009/068034 A1 | 4/2009 |
| WO | 2011/073670 A2 | 6/2011 |

OTHER PUBLICATIONS

Westermann et al., "Demand Matching Wind Power Generation With Wide-Area Measurement and Demand-Side Management," *IEEE Transactions on Energy Conversion* 22(1):145-149, Mar. 2007.

METHOD FOR OPERATING A WIND ENERGY INSTALLATION

BACKGROUND

Technical Field

The present invention concerns a method of feeding electric power into an electric network, in particular using one or more wind power installations. The invention further concerns a wind power installation as well as a wind park and also a wind park arrangement with a plurality of wind parks.

Description of the Related Art

Methods of feeding electric power, in particular by means of wind power installations, into an electric network, are generally known. In addition to purely feeding the available energy or power when a snapshot is considered into the network, such methods for feeding power into the network can and often have to also take into account functions involving networks stabilization. Expressed in simplified terms, it can be provided that, in dependence on the voltage in the network to be fed into, hereinafter referred to for simplicity as the network, more or less power and/or more or less reactive power is to be fed in, to give just some examples. The network voltage, that is to say the amplitude of the electric voltage in the network, in particular an effective value of that voltage, can be an important parameter to implement in dependence thereon the network stabilization measures.

For example, international application WO 02/086315 A1 discloses a network voltage-dependent phase angle regulation and thus a voltage-dependent feed of reactive power. The German patent application laid open as laid-open application DE 19 756 777 A1 discloses a network voltage-dependent power regulation which alters the fed-in power in dependence on the network voltage.

By virtue of the wide dissemination of decentral feed-in apparatuses like wind power installations or wind parks with a plurality of wind power installations, the problem which arises is that a number of installations wish to implement network support independently of each other, in accordance with the same specification. That can have the effect that an installation seeks to compensate for the achieved effect of providing support by another installation. The problem occurs in particular when parameters in the network, in particular the network voltage, are subject to slight fluctuations, that is to say in particular fluctuate somewhat in amplitude and by coincidence one of the installations performing the test by way of example rather detects a lower value in respect of the voltage fluctuations and another installation performs a test and detects a higher value in respect of the fluctuations. In that case the installation which detects a value that tends to be lower is inclined towards initiating measures for increasing the voltage whereas the installation which tends to detect a higher value is inclined towards initiating measures for reducing the voltage. In that way the wind power installations coming on line can operate against each other. The situation can occur in which some network support operations are effected only by one installation, and the other installation makes little or no contribution. Since the voltage may fluctuate at different times and at different locations, this is a different problem.

In a wind park that problem can be resolved by the wind power installations being centrally controlled insofar as they receive for example a percentage adjustment value which is predetermined by a central control unit which correspondingly also operates only one voltage measurement process in the network. At any event the installations in such a wind park can no longer operate in opposition to each other as a result. Central park regulation is shown for example in European patent application EP 2 113 980 A2.

The above-mentioned problem that feeding installations can operate in opposition to each other or at least unwanted unequal distribution of network support occurs, can also correspondingly occur for a plurality of wind parks which are to feed into a network independently of each other. In a situation involving a plurality of different wind parks the problem also often arises that wind power installations from different manufacturers are respectively combined. That causes difficulty at least in coordination and joint presetting of target values, as was explained above for a plurality of wind power installations within a park.

As general state of the art attention is directed to US 2004/0010350, WO 2011/073670 A2 and WO 2009/068034 A1.

BRIEF SUMMARY

One or more embodiments of the present invention is directed to addressing at least one of the above-mentioned problems. In particular, one embodiment of the invention proposes a solution which makes it possible for a plurality of feed-in units which are basically operated independently of each other and which feed into the same network to respectively feed uniformly into the network, and in particular to be able to implement network support measures uniformly, particularly for voltage levels, feed-in capacity and reactive power thereof. The invention also provides alternative solutions and embodiments.

According to one embodiment, the invention there is proposed a method according to claim 1. In accordance therewith electric power is fed into an electric network by a wind power installation with a feed-in arrangement at a feed-in point. There can be provided a wind power installation, a plurality of wind power installations and/or a wind park, in which respect the feed into the network can involve the use of a transformer.

The feed into the network is effected in dependence on electric parameters in the network. Measurement values of the electric parameters or measurement values for determining the electric parameters, if measurement is effected indirectly, are detected at measurement times at predetermined time intervals. The measurement times are synchronized to an external time signal available outside the first feed-in arrangement.

The predetermined time intervals can be for example involving a seconds measured time value or a minutes measured time value. That does not exclude moments in time or some other subpart being used because of given circumstances.

The electric parameters are therefore regularly determined and synchronization which makes it possible to predetermine absolute moments in time is effected by way of the external time signal.

For example a measurement value recording can always be effected at the full minute. That time specification of the full minute however, due to the external synchronization, is a time specification which is also defined outside the feed-in arrangement and is thus also used in other feed-in arrangements which do not have to have any connecting link to that present feed-in arrangement. External synchronization thus permits feed-in arrangements which operate independently of each other to actually regularly detect, at the same measurement time, parameters in the network such as in particular the network voltage. If the network voltage is subject to fluctuations that synchronization effect can provide that feed-in arrangements which are operating independently of each other and which are thus measuring independently of each other measure the same network situation. If therefore by virtue of the selected measurement time, by coincidence, when there is a fluctuating voltage, a high value in respect of that fluctuating voltage is measured, then all those feed-in arrangements measure that high value. Conversely, the same applies, if a low voltage value of such a fluctuating voltage is detected. The feed-in arrangements do not need any communication with each other for that purpose. Only one external synchronization signal needs to be available for each of those stated feed-in arrangements.

Such a time signal or synchronization signal can be for example a time signal from a satellite-supported positioning system such as for example a GPS or other like for example Glonass or Galileo.

Although in particular GPS has popularly become well known for determining position, it also includes a time signal. The official designation of GPS is: "Navigational Satellite Timing and Ranging—Global Positioning System". Such a GPS therefore provides a globally available time signal. There is thus absolutely available a full minute on a world-wide uniform basis—to stay with that example—, irrespective of whether that should coincide for example with a full minute of an atomic clock. The decisive consideration is that all feed-in arrangements which are to be operated with the method according to one embodiment of the invention define the same measurement time according to a common clock. That is possible by using such an external time signal which is available outside the feed-in arrangement, such as that of a GPS.

Preferably the feed-in arrangement is in the form of a wind power installation or in the form of a wind park with a plurality of wind power installations. Thus, particularly for wind power installations which are to feed into the network independently of each other or wind parks which are to provide a feed into the network independently of each other, suitable matching is provided in a simple and efficient fashion. That permits uniform implementation of network support measures without those wind power installations or wind parks which feed into the network independently of each other requiring a communication among each other.

Preferably the measurement values are recorded over a predetermined period duration, in particular averaged. Thus for example for each minute, averaging can be recorded and evaluated over 1 second or 5 seconds—to give just two examples. By establishing absolute measurement times which in that respect can be established for example as moments in time of the beginning of the period duration, measurement recording and in particular averaging is effected in feed-in arrangements operating independently of each other, over the same time range, and thus this entails substantially the same measurement values or averaging values.

Preferably a plurality of feed-in arrangements are operated and each feed-in arrangement is operated for feeding into the network at a respective specific feed-in point. Each of those feed-in arrangements uses the same time signal for synchronization of the respective measurement times. Thus the measurement times of all those feed-in arrangements are synchronized and in corresponding fashion all those feed-in arrangements respectively measure at the same moment in time, that is to say a moment in time which is the same on the basis of an absolute scale. In this case also any voltage fluctuations are admittedly not identified and in that respect there could be a minor measurement error, but such a measurement error would be the same in all those operated feed-in arrangements, at any event insofar as relates to time fluctuations in the network or is caused thereby.

In a further embodiment it is proposed that at least one feed-in arrangement and in particular all the feed-in arrangements involved have a respective clock, in particular a highly accurate clock. In that case the measurement times are calculated by means of the clock and the clock is regularly synchronized by means of the external time signal. That is intended to permit exact timing in respect of the measurement times of that feed-in arrangement in relation to other feed-in arrangements, or to provide exact time in respect of the measurement points of all feed-in arrangements using that method. The use of a local internal clock for the measurement in one embodiment is permitted if the internal clock has been properly synchronized on a regular basis. Thus, the measurement is not dependent on the continuous availability of the external time signal. Rather, the method can be operated on the basis of the internal clock and time comparison with the external synchronization signal that is to implemented sufficiently to ensure it is correct. How often such synchronization has to be effected depends in particular on the accuracy and synchronism quality of the internal clock.

Preferably the network voltage is detected as an electric parameter or parameters. It is also desirable if, in dependence on the detected electric parameters, in particular in dependence on the detected network voltage, measures for supporting the network are effected, in particular reactive power and additionally or alternatively active power is fed into the network in dependence on the detected network voltage. That makes it possible to provide for network support by that reactive and/or active power feed from a plurality of feed-in arrangements, in particular a plurality of wind power installations and in particular a plurality of wind parks, in a uniform fashion. Uneven overloading by such network support from one of the feed-in arrangements is avoided thereby.

Preferably detection of an external time signal can be implemented for synchronizing and/or for effecting synchronization by means of an SCADA wind turbine control system. Use of a SCADA system, which is the acronym for Supervisory Control And Data Acquisition, is known generally in the wind turbine art. That basically known system can also include an internal clock, for example for park regulation. Depending on the respective embodiment involved the SCADA system can also be provided as a central control for a wind park or for sub-functions in the wind park.

There is also proposed a wind power installation having an aerodynamic rotor for producing a rotary movement from wind, an electric generator for generating electric power from the rotary movement and a feed-in means, in particular an inverter, for feeding the electric power or a part thereof into an electric network. It is accordingly proposed that a wind power installation adapted for feeding into a network is operated with a method according to at least one of the described embodiments. In particular such a wind power installation has corresponding technical means which are specified or presupposed to be present in the respective embodiments. In particular such a wind power installation has a control means with a process control which has implemented one of the specified methods. Preferably the wind power installation and in particular its control arrangement has an internal clock which can be synchronized by means of the externally available signal.

There is further proposed a wind park having a plurality of wind power installations, which is controlled with a method according to at least one of the specified embodiments, in particular by such a method being implemented. Such a wind park can have a corresponding wind power installation implemented with such a method or the wind park can include a central control unit for implementing one of the methods. Synchronization and correspondingly implemented measurement at absolute moments in time can be provided centrally for the wind park. In that respect measurement of a plurality of wind parks can be matched to each other by using synchronized measurement times, without the need for communication between the wind parks.

Accordingly there is also proposed a wind park arrangement having a plurality of wind parks, each wind park being controlled with a method according to the invention.

BRIEF DESCRIPTION OF THE SEVERAL VIEWS OF THE DRAWINGS

The invention is described by way of example hereinafter by means of embodiments with reference to the accompanying Figures.

DETAILED DESCRIPTION

Figure 1:
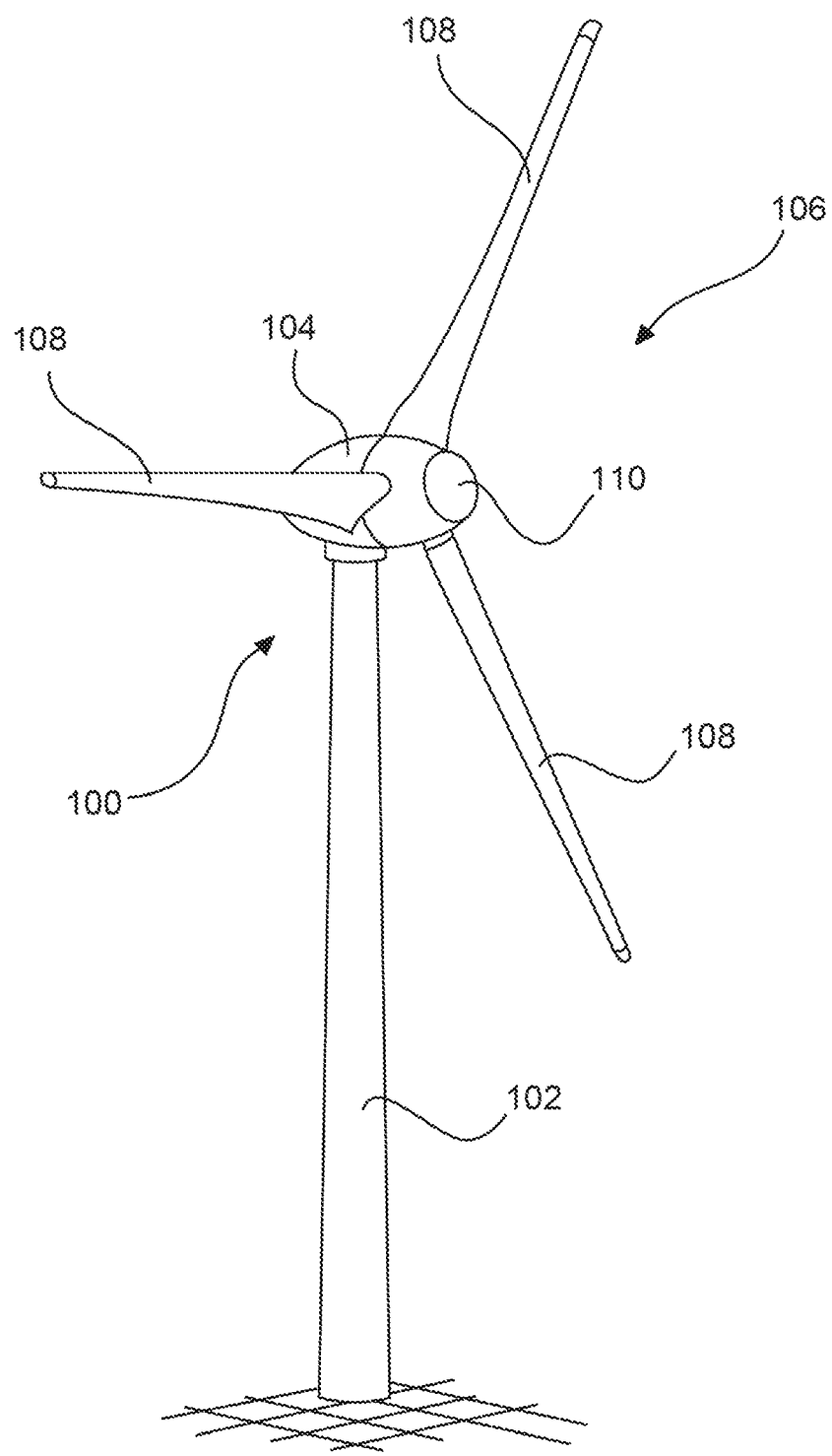
FIG. 1 shows a wind power installation using a method according to one embodiment of the invention, FIG. 2 diagrammatically shows the concept according to one embodiment of the invention for synchronizing two wind parks, FIG. 3 diagrammatically shows a wind park connected to a network with synchronization by means of an SCADA system.

FIG. 1 shows a wind power installation 100 comprising a pylon 102 and a pod 104. A rotor 106 having three rotor blades 108 and a spinner 110 is arranged on the pod 104. In operation the rotor 106 is caused to rotate by the wind and thereby drives a generator in the pod 104.

Figure 2:
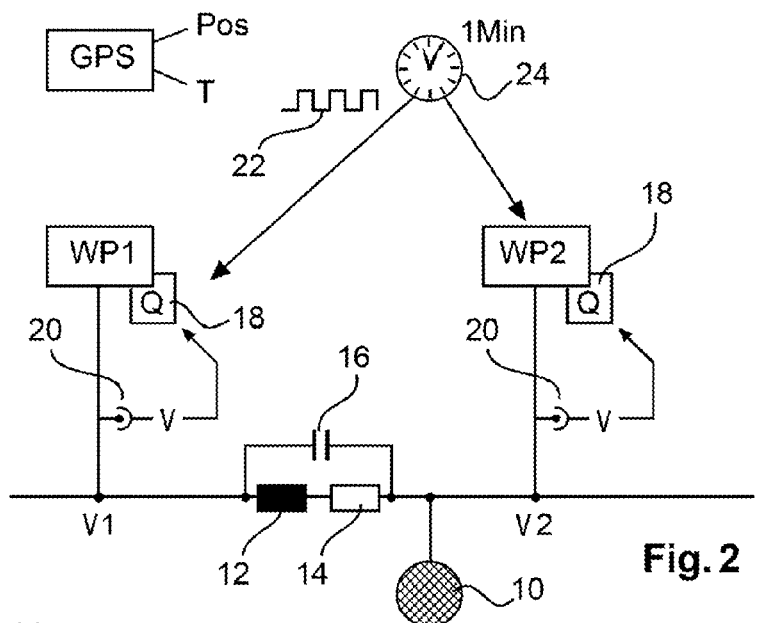

FIG. 2 diagrammatically shows a network 10 whose line properties are indicated by way of illustration by a line inductance 12, a line resistance 14 and a line capacitance 16. In a realistic consideration that affords different voltages in the network which are indicated as $V_1$ and $V_2$, on both sides of that line inductance 12, line resistance 14 and line capacitance 16.

By way of illustration, a first wind park WP1 and a second wind park WP2 feeds in, at the appropriate locations $V_1$ and $V_2$. Each of those two wind parks WP1 and WP2 is in the position of feeding reactive power into the network 10, as indicated by a reactive power setting device 18 which can also be referred to as the Q-setting device.

Accordingly both wind parks WP1 and WP2 have a voltage pickup 20 which correspondingly gives the measured voltage value V to the reactive power setting device 18 so that it can feed reactive power or active power into the network 10 in voltage-dependent relationship.

Figure 5:
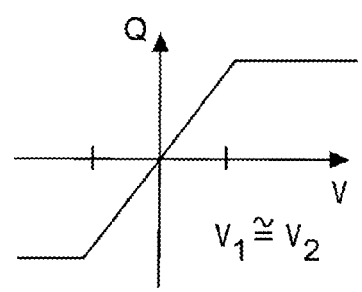
FIG. 5 shows a graph to illustrate voltage-dependent reactive power feed, as a network support example.

A possible way of feeding reactive power into the network is shown in FIG. 5. There the reactive power Q is plotted in dependence on the voltage $V_1$ and $V_2$, respectively. There, for simplification purposes, the basic starting point adopted is a linear relationship between the reactive power Q and the voltage $V_1$ and $V_2$ respectively, which assumes a limit value as from a given value of the voltage. In a first approximation, it is assumed here that the voltages $V_1$ and $V_2$ which can relate to the view in FIG. 2 are approximately equal. It is to be noted that here the important consideration is the voltage level in the sense of the effective value of the voltage. It is also possible to involve other parameters, but this is less usual.

FIG. 2 shows by way of illustration that the two wind parks WP1 and WP2 are synchronized by way of a global time signal 22. That external time signal 22 is here produced by a GPS which, besides outputting a position signal which is indicated there as Pos, also produces a time signal which is indicated there as T. By way of illustration that represents a timer 24 which for example permits synchronization to the beginning of a minute. Each of the wind parks has a GPS sensor as part of WP1 and WP2. The respective GPS sensors pick up the output T signal from the GPS system and use it as a common clock for them. The synchronization information is transmitted from the timer 24 to both wind power installation parks WP1 and WP2.

Figure 3:
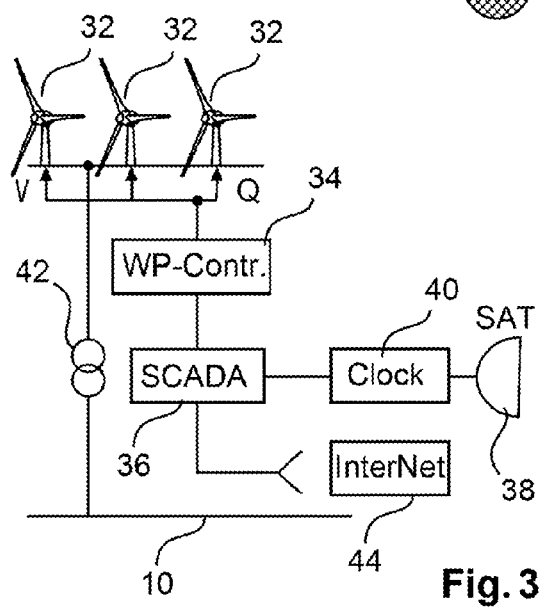

The wind park 30 in FIG. 3 includes three wind power installations 32 for illustration purposes. The wind park 30 and thus the individual installations 32 are controlled by a wind park regulator 34 which can be identified here as the WP-Contr. In this case the wind park or each individual installation receives the voltage U detected in the network and a reference value in respect of reactive power Q.

For that purpose the wind park regulator 34 receives data from the SCADA system 36 which receives inter alia time data 40 from a satellite-supported system 38 for synchronization purposes. The wind park 30 can thus be synchronized to an absolute time signal, it can include identical absolute measurement times corresponding to other wind parks and accordingly it can feed power by way of a transformer 42 illustrated for illustration purposes into the network 10 which can differ from the network 10 in FIG. 2. By way thereof it is also possible to provide for corresponding network support such as for example reactive power feed into the network.

FIG. 3 also shows an Internet 44 which can be connected to the SCADA system 36. Basically it is also possible to provide time synchronization by way of the Internet. Time accuracy requirements are adequate in each case that all wind turbines are using a common time signal, or, in one embodiment, synchronized to a common time signal on a regular basis.

Figure 4:
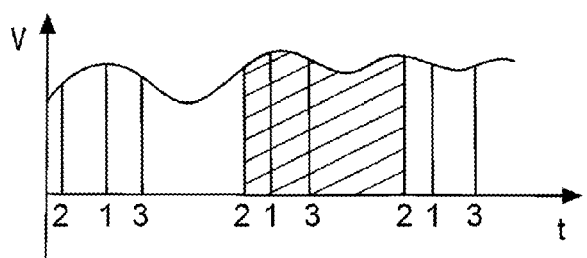
FIG. 4 shows the underlying problems in voltage measurement with a fluctuating voltage.

FIG. 4 shows possible consequences of different measurement times in relation to a fluctuating voltage pattern. In FIG. 4 the network voltage U is plotted in dependence on time t. The digits 1 to 3 are intended to indicate respective measurement times of different wind parks, namely a first, second or third wind park. That could also relate to wind power installations 32 which feed in power, independently of each other. In that respect FIG. 4 makes it clear that there are different voltage levels at different measurement times. In that respect a problem can also arise in regard to average value formation. Thus for example shown in hatching is a region of two measurement points associated with a second feed-in arrangement. The time duration of that hatched region can be for example 400 ms. That averaging operation can also depend on the region over which measurement is implemented. Measurements with averaging can also be improved by the proposed synchronization effect.

By way of example time synchronization can be effected at the minutes change or can always relate to the beginning of a minute. A measurement interval can be 400 ms to give just one example. Averaging can be used as an arithmetic average. It is also possible to consider other methods like for example those having filtering properties.

What is involved as an underlying concept, in respect of various measurements which are effected locally separately from each other, is the acquisition of an almost identical measurement value. If the hardware differences/measurement errors are not considered, the measurement point in time is the main feature for the accurate result. There are three time dependencies: measurement time, measurement duration, sampling times, in respect of which it is proposed that one, a plurality of or all are synchronized.

From a technical point of view it is mainly the measurement moment in time that plays a decisive role in measurement value detection. By means of relatively accurate timers, the error in the measurement duration and the sampling time can generally be negligibly slight in short time periods, which can also depend on specific configurations.

If the measurement time in various, locally mutually separated measurements is not synchronized, considerable deviations can occur, which was recognized by the present invention and is to be avoided thereby.

Thus according to one or more embodiments of the invention the problem that park regulating systems of different parks influence each other can be eliminated or at least reduced. For individual installations in a park, namely a wind park, solutions have already been proposed, which use suitable communication of the wind power installations with each other or communication with a central system like an SCADA.

This permits a uniform feed into the network and in particular network support of wind parks which feed into the network independently of each other. It is to be noted that network support is usually firstly effected by way of reactive power regulation. If that should not suffice, active power regulation can additionally be used.

A measure for improving a unitary measurement between wind parks is using a plurality of sampling values or possibly sampling at a higher rate and/or using a longer measurement period. For example an average value can be formed every 50 ms or every 400 ms starting and ending at the same time at each location. The specified solution of synchronization for example by way of a GPS also affords a solution. In both cases as far as possible the same prerequisites should be afforded between different feeds or feed-in arrangements, in particular different wind parks or wind power installations.

In that respect it is possible to use a GPS which in turn includes a stratum server which has a correspondingly high accuracy category so that as a result synchronization is of an advantageous nature. In particular a so-called Hopf device is used.

For creating identical prerequisites for different feed-in arrangements, in particular different wind parks, it is advantageous if uniform synchronization, a uniform measurement period and a uniform measurement method are involved.

Optionally a measurement period can be increased for example from 440 ms to 1.5 s in order to achieve an improvement thereby. The voltage of the system over this time period is averaged in one embodiment.

In particular time synchronization is thus proposed. In that way it is possible to synchronize autonomous, competing regulators to ensure stability of those, in particular two such regulators.

If a plurality of discrete voltage regulation systems are operated for example at a network feed-in linkage point which can also be referred to as feed-in nodes, they possibly do not run synchronously. In the extreme case that can lead to mutual rising oscillation of the regulators. One reason for that problem is measurement value averaging of the individual regulators.

An almost identical measurement value can be made available to all regulators by using average values as the input parameter, which values can be formed under the same boundary conditions, namely in particular start time, measurement duration and sampling rate. Synchronization is preferably effected solely and simply in relation to time, whereby synchronization becomes possible without direct communication of the installations in question.

Thus there is proposed a solution whose aim is to achieve synchronization of two wind parks by way of a time signal. That can naturally also be applied to a plurality of wind parks. Averaging of the voltage of a network connection point could otherwise start at different measurement times and could also last for different lengths of time, depending on the respective measurement interval used.

Different averaging can lead to oscillation between the wind parks involved, which would have the result that one wind park is loaded more heavily than another and thus unequal load distribution can occur. In this connection attention is also directed to the BDEW (German Association of Energy and Water Industries) Directive, the Technische Richtlinie Erzeugungsanlagen am Mittelspannungsnetz, Richtlinie für Anschluss and Parallelbetrieb von Erzeugungsanlagen am Mittelspannungsnetz, June 2008 edition, which on page 29/138 thereof leaves it open whether averaging of the voltage is effected over 1 s or 1 min. Thus in spite of observing the Directive different measurement periods or measurement intervals can be involved. It is proposed using correspondingly identical measurement intervals.

This method can be used not only in relation to wind parks from different manufacturers but also in relation to spatially separated measurement locations.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of feeding electric power into an electric network, the method comprising:
   measuring electric network parameters at two different locations of the electric network, the measuring at the two different locations occurring over the same time period; and
   feeding power into the network from at least one wind power installation wherein the feed is effected by means of the at least one wind power installation with a first feed-in arrangement at a feed-in point into the electric network, and the feed is effected in dependence on the measured electric network parameters in the network and the measurement values of the electric parameters are detected at measurement times at predetermined time intervals and wherein the measurement times are synchronized to an external time signal available outside the first feed-in arrangement.

2. A method according to claim 1 wherein the at least one wind power installation is in the form of a wind park with a plurality of wind power installations.

3. A method according to claim 1 wherein the measurement values are recorded as average values over a predetermined period duration, in particular averaged.

4. A method according to claim 1 wherein a plurality of feed-in arrangements are operated and each feed-in arrangement is operated for feeding into the network at a respective dedicated feed-in point and wherein each of said feed-in arrangements uses the same time signal for synchronization of the respective measurement times so that the measurement times of all said feed-in arrangements are synchronized so that all said feed-in arrangements detect the measurement values at respective identical moments in time.

5. A method according to claim 4 wherein the feed-in arrangements respectively use identical synchronization, an identical measurement period and/or an identical measurement method.

6. A method according to claim 1 wherein a time signal of a satellite-supported positioning system such as for example GPS is used as the external time signal.

7. A method according to claim 1 wherein at least one feed-in arrangement has a respective clock, in particular a highly accurate clock, the measurement times are calculated by means of the clock and the clock is regularly synchronized by means of the external time signal to achieve time equality of the measurement times of the feed-in arrangements.

8. A method according to claim 1 wherein the network voltage is detected as the electric parameters.

9. A method according to claim 1 wherein measures for supporting the network are implemented in dependence on the detected electric parameters, in particular in dependence on the detected network voltage, and in particular active power and/or reactive power are fed into the network in dependence on the detected network voltage.

10. A wind power installation-comprising:
   an aerodynamic rotor for producing a rotary movement from wind;
   an electric generator for generating electric power from the rotary movement;
   an inverter, for feeding the electric power or a part thereof into an electric network at a feed-in point using a feed-in arrangement; and,
   a controller that:
      receives measured electric network parameters at two different locations of the electric network, the electric network parameters being measured over the same time period, the measured electric network parameters being made at measurement times in accordance with predetermined time intervals and wherein the measurement times are synchronized to an external time signal available outside of the feed-in arrangement; and
      determines the electric power feed into the electric network in dependence on the measured electric network parameters.

11. A wind park having a plurality of wind power installations according to claim 10.

12. A wind park arrangement having a plurality of wind parks according to claim 11.

13. The method according to claim 1, wherein feed-in point is within the feed-in arrangement.

14. The wind power installation according to claim 10, further comprising:
   a regulator including:
      a voltage pickup device; and
      a reactive power setting device.

15. A method of feeding electric power into an electric network, the method comprising:
   determining measurement values of an electrical parameter of the electric network at a plurality of feed-in locations based on an external clock that is operatively coupled to a plurality of wind power installations, wherein the determining occurs at a particular time and for a particular duration of time based on the external clock; and
   using at least one wind power installation that is coupled to a first one of the plurality of feed-in arrangements, to feed in electric power generated by the at least one wind power installation based on at least one of the determined measurement values of the electric parameter network that are synchronized.

16. The method according to claim 15, wherein the measurement values are averaged to determine an averaged measurement value, wherein feeding in the electric power is based on the averaged measurement value.

17. The method according to claim 15, wherein the external clock is a part of a global positioning system.

18. The method according to claim 15, wherein the electric parameter is the voltage of the electric network.

* * * * *